United States Patent [19]

Warner et al.

[11] Patent Number: 5,129,191
[45] Date of Patent: Jul. 14, 1992

[54] ADHESIVE BONDED FLEXIBLE ABRASIVE FINISHING TOOL

[75] Inventors: R. Brown Warner, Westlake; Alfred F. Scheider, Orange, both of Ohio

[73] Assignee: Jason Inc., Cleveland, Ohio

[21] Appl. No.: 228,438

[22] Filed: Aug. 5, 1988

[51] Int. Cl.$^5$ .................................................. B24B 1/00
[52] U.S. Cl. ........................................ 51/330; 51/334; 300/21
[58] Field of Search ............... 51/330, 334, 336, 400; 300/5, 7, 8, 9, 21; 15/159 R, 179, 136, 190, 192, 193, 191 R, 51, 300

[56] References Cited

U.S. PATENT DOCUMENTS

| | | | |
|---|---|---|---|
| 2,049,324 | 7/1936 | Schneider | 51/337 |
| 2,934,777 | 5/1960 | Hanset | 15/193 |
| 2,982,983 | 5/1961 | Peterson | 300/21 |
| 3,237,234 | 3/1966 | Tilgner | 300/21 |
| 3,577,839 | 5/1971 | Charvat et al. | 51/400 |
| 4,133,147 | 1/1979 | Swift, Jr. | 51/400 |

Primary Examiner—M. Bachuba
Attorney, Agent, or Firm—Renner, Otto, Boisselle & Sklar

[57] ABSTRACT

An adhesive bonded flexible abrasive finishing tool and method of making the same includes a cup-shape shank of plastic or metal. Flexible nylon abrasive loaded monofilaments of uniform length are formed into a cylindrical bundle. A measured amount of liquid instant cyanoacrylate adhesive is placed into the bottom of the cup portion of the shank and the bundle of monofilaments is driven as a group endwise by a pressure plate through a split funnel mounted on the lip of the cup so that one end of the bundle and thus each monofilament is driven uniformly into the adhesive which then cures rapidly. The monofilaments may preferably be straight or somewhat crimped or wavy and may vary in sectional configuration and abrasive loading. The resulting brush or finishing tool is a low cost light weight tool having improved distribution and density of filaments and a flat even face without a final trimming operation. The tool is ideally suited for automated or robotics finishing operations.

15 Claims, 1 Drawing Sheet

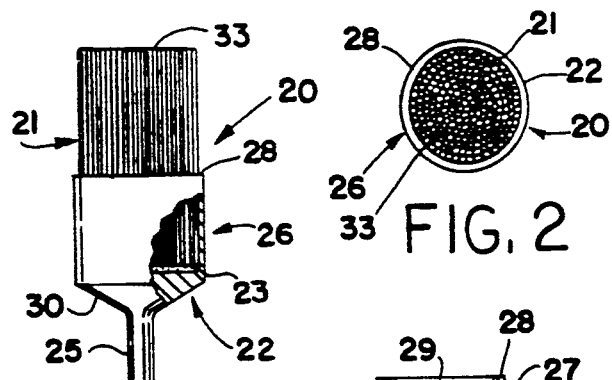
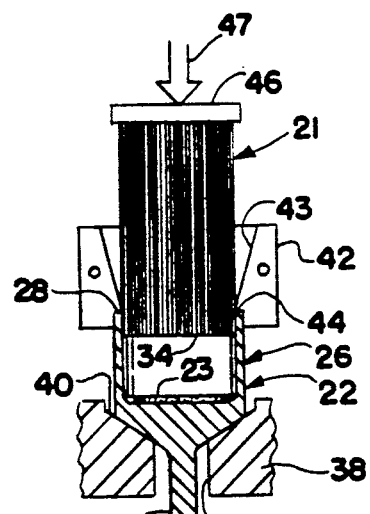
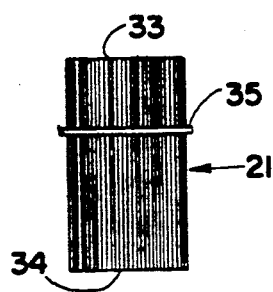
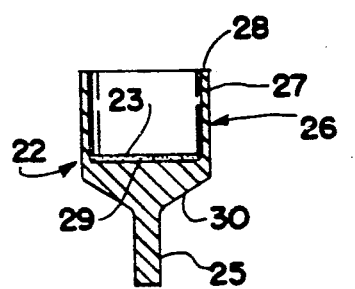
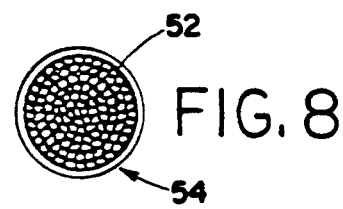
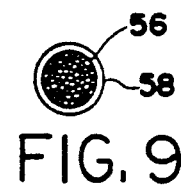

ADHESIVE BONDED FLEXIBLE ABRASIVE FINISHING TOOL

DISCLOSURE

This invention relates generally as indicated to an adhesive bonded flexible abrasive finishing tool including a method of making the same, and more particularly to a low cost and light weight end brush type abrasive tool having improved distribution and density of filaments and which is particularly suited to automatic or robotics applications.

BACKGROUND OF THE INVENTION

End brushes or finishing tools are often manufactured utilizing rings, sleeves, pins or keys as anchors to secure the filament bundle in the cap of the shank with the filament bundle being folded as a hairpin in the cup of the shank. This results in a non-uniform distribution and density of the filaments and also normally requires secondary operations such as trimming of the brush face and crimping or swaging of the lip of the cup. Such internal anchors can in and of themselves affect the dynamic balance of the tool quite apart from causing non-uniform distribution of the filaments. Examples of end brushes or tools using mechanical anchors or keys may be seen in prior U.S. Pat. Nos. 2,982,983, 3,312,993, and 2,421,647.

As indicated in the latter two patents a solder or adhesive may be used in addition to the key or other anchor with the preferred adhesive in U.S. Pat. No. 2,982,983 being epoxy resins. Many adhesive systems are too viscous, difficult to apply and use and require a substantial cure time. If the preferred filament is a plastic, such as a polyamide with abrasive heavily loaded therein it is difficult to bond the filaments uniformly with an adhesive to a metal or plastic shank without the aid of an anchor and the attendant problems. The adhesive should be a low viscosity liquid which can be readily metered and which when applied to the bottom of the cup of the shank will uniformly cover the bottom of the cup to a uniform depth. Moreover, the adhesive should not be a two-part system such as epoxy and should cure quickly.

A method of manufacture of such tool should enable the tool to be made and assembled quickly without secondary operations such as the trimming of the tool face or modification of the shank to enhance the securing the filament bundle to the shank.

SUMMARY OF THE INVENTION

An adhesive bonded flexible abrasive finishing tool and method of making the same includes a cup-shape shank of plastic or metal. Flexible nylon abrasive loaded monofilaments of uniform length are formed into a cylindrical bundle. A measured amount of liquid instant cyanoacrylate adhesive is placed into the bottom of the cup portion of the shank and the bundle of monofilaments is driven as a group endwise by a pressure plate through a split funnel mounted on the lip of the cup so that one end of the bundle and thus each monofilament is driven uniformly into the adhesive which then cures rapidly. The monofilaments may preferably be straight or somewhat crimped or wavy and may vary in sectional configuration and abrasive loading. The resulting brush or finishing tool is a low cost light weight tool having improved distribution and density of filaments and a flat even face without a final trimming operation.

The tool is ideally suited for automated or robotics finishing operations.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is an elevation partially broken away and in section of a finishing tool in accordance with the present invention;

FIG. 2 is a view of the tool from the top of FIG. 1 showing the working face;

FIG. 3 is a transverse axial section of the shank;

FIG. 4 is an elevation of the preassembled cut bundle of filaments;

FIG. 5 is a section of the shank showing the liquid adhesive inserted in the bottom of the cup of the shank;

FIG. 6 is a view showing the assembly of the bundle and shank;

FIG. 7 is a view similar to FIG. 1 showing the employment of a lightweight plastic shank;

FIG. 8 is a view similar to FIG. 2 showing a tool formed with a different size filament in the bundle;

FIG. 9 is a similar view of a smaller tool using the same size filament as in FIG. 2;

FIG. 10 is a view similar to FIG. 9 illustrating the face of a tool with a different type of filament;

FIG. 11 is a view of a straight single filament which may be employed in the formation of the bundle;

FIG. 12 is a similar view of a wavy or slightly crimped filament which may be employed in the formation of the bundle;

FIGS. 13–16 are enlarged sections of various types of filaments which may be used with the present invention;

FIG. 17 is a similar section of a plastic monofilament without embedded abrasive which may be used with the method of the invention to form an end brush.

DETAILED DESCRIPTION OF THE PREFERRED EMBODIMENTS

Referring first to FIGS. 1 and 2 there is illustrated a flexible abrasive finishing tool shown generally at 20 in accordance with the present invention. The tool comprises a cylindrical bundle of abrasive loaded monofilaments 21 which are inserted in a cup-shape shank 22 and bonded to the bottom surface of the cup of the shank by a liquid instant adhesive seen at 23.

As seen in FIG. 3 the shank 22 includes an axially projecting cylindrical arbor 25 which may be gripped by the collet of a power tool. The top of the collet is formed into a cup shown generally at 26 which includes an annular skirt 27 having a top lip 29 and a flat circular bottom wall 29 which extends normal to the axis of the shank. The bottom of the cup-shape portion tapers into the arbor as indicated at 30.

Referring now to FIG. 4 it will be seen that the cylindrical bundle of abrasive loaded plastic monofilaments 21 is preassembled into such bundle and when preassembled the bundle will be provided with circular end faces 33 and 34 which are normal to the axis of the bundle. After the bundle of such monofilaments is formed, each cut to the same length, it may be temporarily held in such cylindrical bundle form by an elastic, tape or paper band indicated at 35.

As seen in FIG. 5 the bottom wall 29 of the cup portion of the shank is provided with a uniform distribution of a metered amount of liquid instant adhesive seen at 23. The cylindrical bundle of monofilaments is then driven into the interior of the cup of the shank so that the liquid instant adhesive engages each of the monofilaments at the face 34 bonding the filaments to the shank. The opposite end face 33 of the bundle then becomes the working face of the tool without subsequent trimming as seen in FIGS. 1 and 2.

Referring now to FIG. 6 there is illustrated a preferred form of assembling the tool of the present invention. The shank 22 is supported in a jig 38 which may be provided with a hole 39 accommodating the arbor 25. The jig is provided with a tapered conical support surface 40 to ensure that the shank is supported in a vertical upright position. A metered amount of liquid instant adhesive 23 is then placed in the bottom of the cup-shape portion. A split guide funnel 42 is then positioned on top of the lip 28 of the cup-shape portion 26. The guide funnel has an interior conical surface 43 which tapers to shoulder 44 which is mounted on the lip 28 of the shank. At the shoulder the internal diameter of the conical surface is the same as the internal diameter of the cup of the shank.

The cylindrical bundle of monofilaments 21 is then placed within the funnel and driven downwardly by pusher plate 46 by a suitable linear actuator such as seen schematically by the arrow 47. In this manner the end face 34 of the bundle 21 is driven into the liquid adhesive 23 which quickly sets bonding each monofilament of the bundle to the bottom wall of the cup-shape portion of the shank. Because of the low viscosity of the adhesive some of the adhesive will penetrate between the monofilaments at the face 34 bonding the inner end of each monofilament to adjacent monofilaments.

A suitable pressure limit may retract the pressure plate 46. The split funnel may then be removed and the completed adhesive bonded flexible abrasive finishing tool may be removed from the support jig.

In the embodiment of the tool seen in FIGS. 1–6 the shank is metal. However, in the embodiment of FIG. 7 the shank illustrated at 50 is formed of plastic which is approximately one-third the weight of the metal shank. The configuration of the shank is otherwise the same and again a metered amount of liquid instant adhesive indicated at 23 is employed to bond the filament bundle to the shank and the tool may be made in essentially the same manner as in FIG. 6.

The plastic shank may be formed of non-brittle plastic such as nylon as long as the plastic material has sufficient strength to absorb the hoop stress in the cup wall as the bundle is driven into the interior of the cup. The lighter weight tool such as seen in FIG. 7 requires less torque for rotation and if employed on the end of a robotic arm, the lighter weight provides quicker and more accurate positioning of the tool.

In FIG. 8 there is illustrated the working face of a tool in accordance with the present invention employing fairly large diameter cylindrical nylon abrasive mineral loaded monofilaments as indicated at 52. The shank indicated at 54 may be plastic or metal. A conventional nylon abrasive mineral loaded monofilament as illustrated may be approximately 0.045 inch in diameter and loaded to about 30% by weight of abrasive mineral.

In FIG. 9 there is illustrated a somewhat smaller tool using a smaller diameter nylon abrasive mineral loaded monofilament 56 and a smaller shank 58. In FIG. 9 the diameter of the monofilament may be approximately half that in FIG. 8.

In FIG. 10 there is illustrated a small finishing tool in accordance with the present invention utilizing generally rectangular monofilaments shown at 60 again positioned in a metal or plastic shank 62. As described in more detail in applicants' copending application entitled "Rotary Abrasive Tool And Filament Therefor", Ser. No. 216,710, filed Jul. 8, 1988, such rectangular monofilaments may be approximately 0.045×0.090 inch or wider and because of the configuration of the monofilament, increased abrasive loading may be obtained up to approximately 45% by weight. The rectangular nature of the filament also significantly increases the stiffness of the filament. Because of the increased abrasive loading and the ability to pack more tightly the rectangular filament, the tool of FIG. 10 presents more abrasive material to the working face.

As seen in FIG. 11 the preferred form of monofilament 64 is a straight monofilament. However, as indicated in FIG. 12 abrasive finishing tools in accordance with the present invention may be made with crimped or wave form monofilaments as indicated at 65. While the crimped or wave form of monofilament reduces the monofilament density, it nonetheless presents the end of the monofilament as indicated at 66 at a slight random angle to the working face of the tool providing somewhat more aggressive action at the work face.

In FIG. 13 there is illustrated a typical round monofilament which of course may vary in diameter as indicated. In FIG. 14 there is illustrated a triangular monofilament 68. In FIG. 15 there is illustrated a square or rectangular monofilament 70 and in FIG. 16 there is illustrated the rectangular monofilament 60. Any of such configurations may be employed with the present invention.

Although in the preferred form of the tool, abrasive loaded nylon monofilaments are employed, it will be appreciated that other plastics may be employed both with and without such abrasive loading. Examples of other types of plastics are aramids, polyesters and polypropylenes. FIG. 17 illustrates a plastic monofilament 72 without abrasive loading which may be formed by the method of the present invention into an end brush using the instant liquid adhesive and the method disclosed. The non-abrasive loaded filaments may also have the sectional configurations shown in FIGS. 14–16.

As a liquid instant adhesive, it is preferred to employ a cyanoacrylate of low viscosity or high fluidity. It is important that when the adhesive is applied to the bottom wall of the cup that it uniformly cover that wall as indicated in FIG. 5.

Useful with the present invention are alkyl cyanoacrylates having the formula:

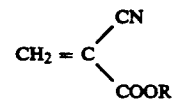

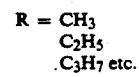

A preferred cyanoacrylate adhesive is an alkoxy alkyl cyanoacrylate having the formula:

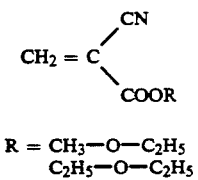

$$R = CH_3-O-C_2H_5$$
$$C_2H_5-O-C_2H_5$$

Suitable adhesives are available from Loctite Corporation of Newington, Conn. under the trademark SUPERBONDER® 495 or the trademark BLACK MAX. SUPERBONDER is a registered trademark of Loctite Corporation. BLACK MAX is also a trademark of Loctite Corporation.

As the abrasive fill material for the plastic monofilaments, conventional abrasive minerals such as aluminum oxide or silicon carbide may be employed. However, more exotic abrasive minerals may be used such as polycrystalline diamond or cubic boron nitride.

It can now be seen that there is provided a simple and easily constructed adhesive bonded flexible abrasive finishing tool. The tool nonetheless has significant advantages when compared to tools using "hairpin" anchors or rings, sleeves or locking pins. Without the latter a more uniform distribution of the fill materials is obtained and more fill material per tool is obtained because there is no interference with internal locking or mechanical devices.

The method of manufacture also permits the formation of a tool with a flat finished tool face without a final costly trimming operation. Obviously, the more exotic the abrasive material employed such as polycrystalline diamond, the more costly will be the trimming operation. Without the trimming operation there is no waste of such expensive fill materials. With the present invention the materials are cut one time and pressed into the cup shape shank. Any unevenness is buried inside the cup of the shank and is held firmly by the instant adhesive.

Moreover, without the internal locks and with the even distribution of the adhesive and the filament material, better concentricity is obtained avoiding run out or out of round condition problems. The better dynamic balance avoids chatter, bounce or intermittent marks on the workpiece. Such smoother operation also extends the life of the drive motor and makes the tool more effective for robotic operations.

Also, as indicated, the lightweight plastic shank form of the present invention requires less torque and is more readily quickly positioned by a robotic arm.

The avoidance of the mechanical lock for the filaments internally of the shank also avoids distorting the filaments, such distortion in many cases leading to fracture or early fracture in us.

The simplified method of manufacture permits the use of a wide variety of advanced abrasive filament forms such as the noted straight and crimped round forms, as well as rectangular, flat, oval, square and many other shapes.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A method of making a rotary finishing tool comprising the steps of forming a measured bundle of uniformly closely packed nonwoven, generally parallel plastic monofilaments, supporting a cupped shank, placing a measured amount of liquid adhesive in the bottom interior of said cupped shank so that such adhesive completely covers the bottom of the interior of the cup portion of the shank, and promptly driving such bundle into the cup portion of the shank so that all of the monofilaments at one end of the bundle are in contact with the adhesive, prior to the curing of the adhesive.

2. A method as set forth in claim 1 wherein said monofilaments are about 30% by weight loaded with mineral abrasive said mineral abrasive being embedded substantially homogeneously throughout each monofilaments.

3. A method as set forth in claim 1 wherein said liquid adhesive is a cyanoacrylate.

4. A method as set forth in claim 3 wherein said adhesive is an alkyl cyanoacrylate.

5. A method as set forth in claim 3 wherein said adhesive is an alkoxy alkyl cyanoacrylate.

6. A method as set forth in claim 3 wherein said adhesive in its uncured form has a low viscosity and completely covers the bottom of the cup portion of the shank.

7. A method as set forth in claim 1 wherein the shank is plastic.

8. A method as set forth in claim 1 wherein the shank is metal.

9. A method as set forth in claim 1 wherein said plastic monofilaments are abrasive loaded nylon.

10. A method as set forth in claim 1 wherein said plastic monofilaments are round in transverse section.

11. A method as set forth in claim 1 wherein said plastic monofilaments are a polygon in transverse section.

12. A method as set forth in claim 1 wherein said plastic monofilaments are rectangular in transverse section.

13. A method as set forth in claim 12 wherein said monofilaments contain about 45% by weight of abrasive mineral.

14. A method as set forth in claim 1 wherein said bundle is formed by a plurality of monofilaments each cut to the same length.

15. A tool as set forth in claim 1 wherein said plastic monofilaments are made of a plastic selected from a group consisting of nylons, polypropylenes, aramids and polyesters.

* * * * *